US008299928B2

(12) United States Patent
Kennedy

(10) Patent No.: US 8,299,928 B2
(45) Date of Patent: *Oct. 30, 2012

(54) SYSTEMS AND METHODS FOR PROVIDING VIEWER-RELATED INFORMATION ON A DISPLAY BASED UPON WIRELESS IDENTIFICATION OF A PARTICULAR VIEWER

(75) Inventor: John T. Kennedy, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/183,098

(22) Filed: Jul. 14, 2011

(65) Prior Publication Data

US 2011/0271301 A1  Nov. 3, 2011

Related U.S. Application Data

(63) Continuation of application No. 12/342,649, filed on Dec. 23, 2008, now Pat. No. 7,982,615.

(51) Int. Cl.
*G08B 13/14* (2006.01)
(52) U.S. Cl. ............ 340/572.4; 340/572.1; 340/539.19; 340/539.21; 340/239.23; 725/35
(58) Field of Classification Search ............... 340/572.1, 340/572.4, 539.16, 539.19, 539.21, 539.23, 340/825.69; 348/563, 564; 725/25, 26, 34, 725/35, 42, 46
See application file for complete search history.

(56) References Cited

U.S. PATENT DOCUMENTS

| 6,163,316 | A  | * | 12/2000 | Killian ........................ 715/721 |
| 6,438,752 | B1 | * | 8/2002  | McClard ........................ 725/46 |
| 6,647,548 | B1 |   | 11/2003 | Lu et al. |
| 6,912,398 | B1 | * | 6/2005  | Domnitz ........................ 455/461 |
| 7,568,211 | B2 |   | 7/2009  | Mai et al. |
| 2002/0166119 | A1 |   | 11/2002 | Cristofalo |
| 2004/0117269 | A1 |   | 6/2004  | Karaoguz et al. |
| 2006/0095471 | A1 |   | 5/2006  | Krikorian et al. |

(Continued)

FOREIGN PATENT DOCUMENTS

WO  2007036891 A2  4/2007

OTHER PUBLICATIONS

European Patent Office, International Searching Authority, "International Search Report" mailed Mar. 24, 2010 for International Application No. PCT/US2009/068794 filed Dec. 18, 2009.

(Continued)

*Primary Examiner* — Hung T. Nguyen
(74) *Attorney, Agent, or Firm* — Ingrassia Fisher & Lorenz, P.C.

(57) ABSTRACT

Systems and methods are described for presenting viewer-related programming to a particular viewer. In at least one embodiment, a wireless reader is configured to receive at least one identifier when the particular viewer is in proximity to the reader. A controller is configured to receive the identifier from the wireless reader and to associate the identifier with the particular viewer, and, upon successfully associating the wireless identifier with the particular viewer, to present the viewer-related programming associated with the particular viewer via the display or other presentation device located in proximity to the wireless reader. Viewer-related programming may including placeshifted content, viewing preferences, settings or other information as desired.

20 Claims, 2 Drawing Sheets

U.S. PATENT DOCUMENTS

2010/0156627 A1    6/2010  Kennedy

OTHER PUBLICATIONS

Figure 1:
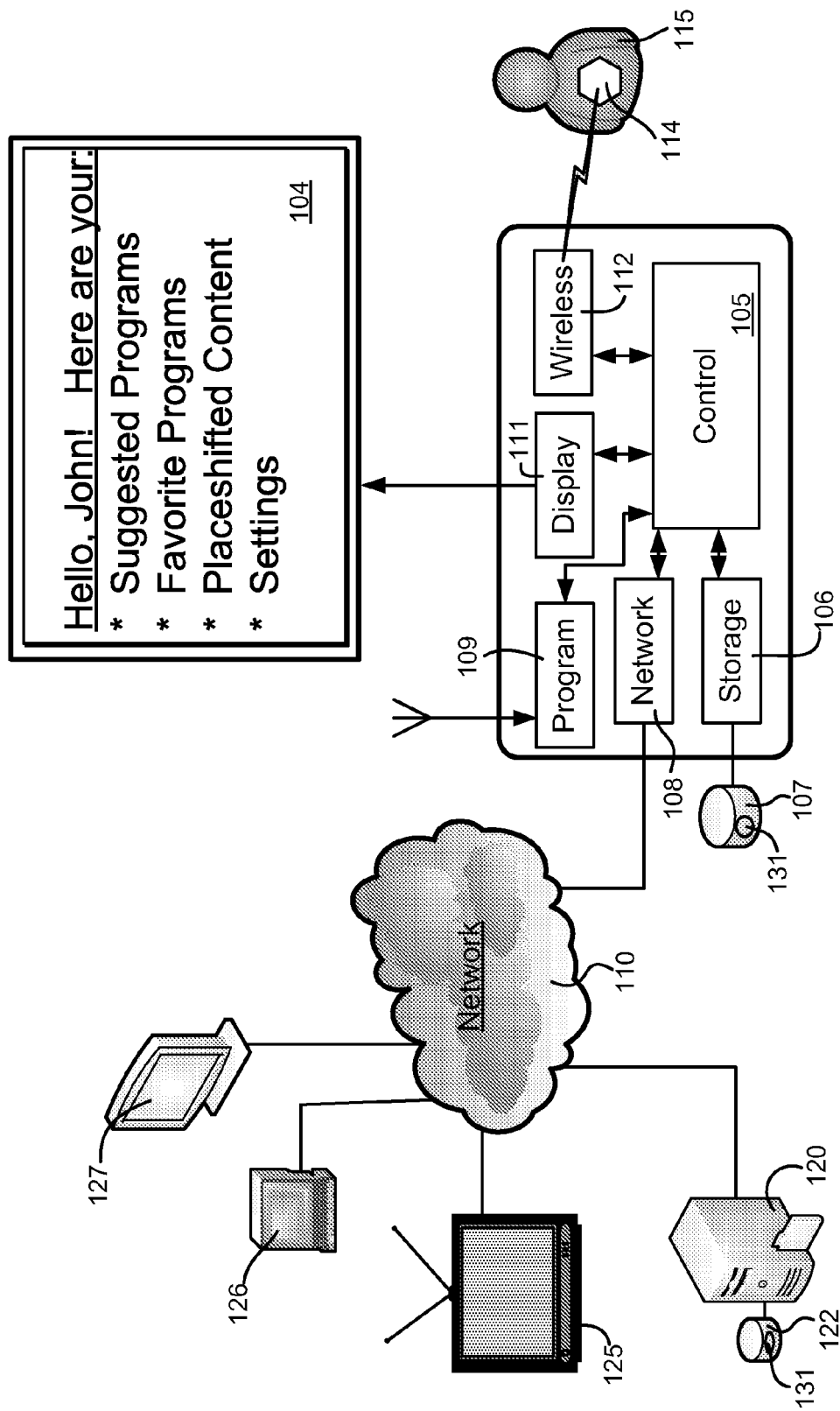

Krumm J. et al "Multi-Camera Multi-Persno Tracking for EasyLiving," Proceednigs: IEEE Workshop on Visual Surveillance, XX, XX, Jul. 1, 2000, pp. 3-10, XP002370211, col. 2, line 4-27.

Brumit, Barry et al. "EasyLiving: Technologies for Intelligent Environments," Lecture Notes in Computer Science, vol. 1927/2000, Jan. 1, 2000, pp. 97-119, XP002572130, Heidelberg, Sec. 9.

USPTO "Notice of Allowance" mailed Apr. 1, 2011; U.S. Appl. No. 12/342,649, filed Dec. 23, 2008.

* cited by examiner

SYSTEMS AND METHODS FOR PROVIDING VIEWER-RELATED INFORMATION ON A DISPLAY BASED UPON WIRELESS IDENTIFICATION OF A PARTICULAR VIEWER

CROSS-REFERENCES TO RELATED APPLICATIONS

This application is a continuation of and claims priority to U.S. Non-Provisional application Ser. No. 12/342,649, filed Dec. 23, 2008, which is now U.S. Pat. No. 7,982,615.

TECHNICAL FIELD

The following discussion generally relates to consumer electronics devices such as set-top boxes, television receivers, media players and/or the like.

BACKGROUND

Most television viewers now receive their television signals through a content aggregator such as a cable or satellite television provider. In the typical instance, encoded television signals are sent via a cable or wireless data link to the viewer's home, where the signals are ultimately decoded in a set-top box, receiver or similar consumer device. The decoded signals can then be viewed on a television or other appropriate display as desired by the viewer.

In recent years, the capabilities provided by many set top boxes and other television receivers have been dramatically enhanced. Rather than simply receiving and decoding television content from a broadcast, cable, satellite or other source, modern receivers commonly provide additional services and features such as electronic program guides, placeshifting features, digital video recorder (DVR) capabilities, and/or the like. These features allow viewers significant flexibility in customizing their viewing experiences in terms of selecting various settings for presenting programming in a desired manner, shifting viewing to other locations or times, and/or features as desired.

Often, however, a set-top box or other television receiver is shared between multiple users living within a household, dormitory, or other environment. Each of these users may have unique programming and other preferences based upon their demographics and/or personal tastes. Typically, however, it is very difficult to identify the viewer using a particular device without requiring the user to provide some sort of userid/password or other manually-provided credential. The process of providing such information can be cumbersome and inconvenient, and as a result many users simply choose not to use customized features, even when such features are available.

It is therefore desirable to create systems and methods that are able to readily identify particular viewers and provide viewer-related content to the identified particular viewers. These and other desirable features and characteristics will become apparent from the subsequent detailed description and the appended claims, taken in conjunction with the accompanying drawings and this background section.

BRIEF SUMMARY

According to various exemplary embodiments, systems and methods are described for presenting viewer-related programming. A wireless reader is configured to receive an identifier when the particular viewer is in proximity to the reader. A controller is configured to receive the identifier from the wireless reader and to associate the identifier with the particular viewer, and, upon successfully associating the wireless identifier with the particular viewer, to present the viewer-related programming associated with the particular viewer via a display or other presentation device located in proximity to the wireless reader. Viewer-related programming may including placeshifted content, viewing preferences, settings and/or other information as desired.

In other embodiments, a method of providing access in a television viewing device to viewer-related information associated with a particular viewer is provided. The method comprises receiving a wireless signal comprising a wireless identifier when the particular viewer is in proximity to the television viewing device, associating the wireless identifier with the particular viewer, and, upon successfully associating the wireless identifier with the particular viewer, providing access on the television viewing device to the viewer-related information associated with the particular viewer.

In still other embodiments, a television receiver system for receiving and decoding television programming for presentation on a television is provided. The television receiver system suitably comprises an RFID reader configured to broadcast a wireless RFID query and to receive a wireless signal comprising an RFID code when an RFID tag in the possession of a particular viewer is in proximity to the system, a television interface configured to be coupled to the television, and a controller. The controller is configured to receive the RFID code from the RFID reader and to associate the RFID code with the particular viewer, and, upon successfully associating the wireless identifier with the particular viewer, to present the viewer-related programming associated with the particular viewer via the display interface.

Various embodiments, aspects and other features are described in more detail below.

BRIEF DESCRIPTION OF THE DRAWING FIGURES

Figure 2:
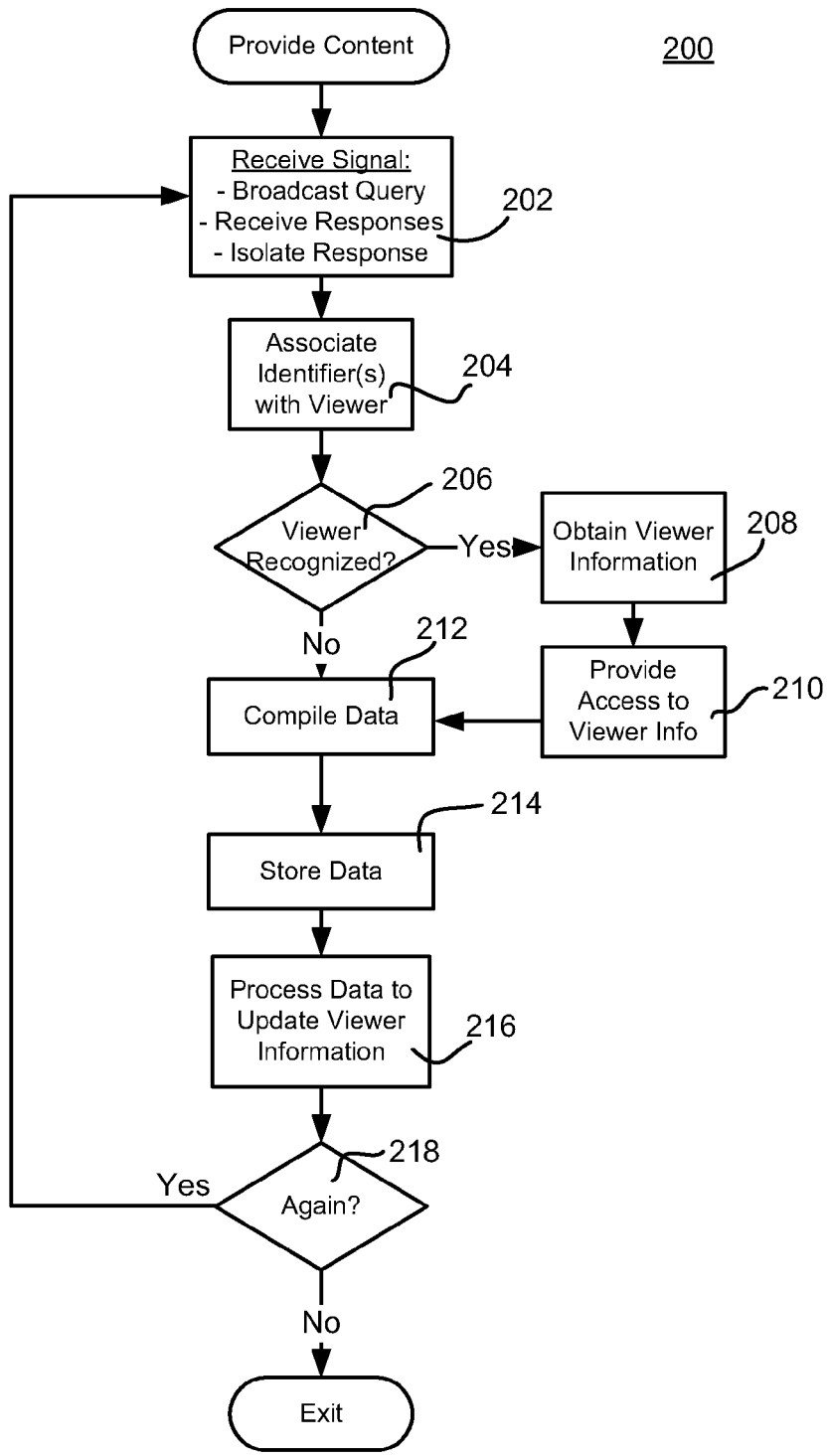

Exemplary embodiments will hereinafter be described in conjunction with the following drawing figures, wherein like numerals denote like elements, and FIG. 1 is a block diagram of an exemplary system for providing viewer-related content; and FIG. 2 is a flowchart of an exemplary method for processing viewer-related content.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a set-top box (STB), television receiver and/or similar device can be equipped with a wireless receiver (e.g., a radio frequency identification (RFID) receiver) that is able to automatically identify one or more viewers in proximity to the device based upon wireless transceivers that may be carried on or near the viewer's person. Many people conventionally carry credit cards, identification cards, drivers' licenses, clothing and/or other articles that may include conventional RFID tags. Such tags are becoming increasingly common, particularly as many agencies now incorporate RFID or similar functionality in government-issued identification cards. By identifying a tag carried by the viewer, the viewer can be anonymously or otherwise identified, and this identity can be used to gather information about the viewer's preferences or the like. These preferences can be used to suggest programs that the viewer might enjoy, to call attention to current showings of favorite programs, to present targeted advertisements, and/or for any other services or features as desired.

Moreover, by detecting the identity of the viewer at multiple locations, various types of viewer-related content can be provided to the viewer's actual location. That is, viewer-related content can follow the particular viewer as he or she moves throughout a home or other structure, or travels to a different location. Examples of viewer-related content provided in various embodiments might include, without limitation, placeshifted content from a home device, programming preferences and other favorites, settings preferences, and/or the like.

This feature may be exploited in many different ways. By detecting the viewer's location or proximity, for example, multiple televisions or other displays located around a home might be automatically tuned to a particular program as the viewer moves around the home. Further, as the viewer travels to a hotel room or other remote location, a television receiver in the remote location might identify the viewer based upon the RFID or other identifier so that specific features at the new location could be brought to the viewer's attention. Favorite programs identified by the viewer's home viewing, for example, could be highlighted to allow the traveling viewer to find the program at a new channel and/or time in the new environment. Placeshifted content from the viewer's home device could be additionally or alternately provided. Other embodiments may adjust the viewing settings in the new environment to match the viewer's home preferences. Many other features and aspects could be provided in any number of further embodiments.

Turning now to the drawing figures and with initial reference to FIG. 1, an exemplary system 100 for providing viewer-related content to a particular viewer 115 suitably includes a television receiver system 102 that allows viewing of television content on a display 104. Some embodiments may be locally contained in the sense that information is gathered, processed and retained at a single receiver system 102. Other embodiments, however, may allow for information sharing over a network 110 to facilitate access to viewer-related programming and/or other information on displays other than the display 104 typically associated with the viewer's home receiver system 102. In such embodiments, information may be stored, processed and/or accessed via server 120 or the like.

Generally speaking, viewers 115 are identified by the presence of an RFID tag or any other device capable of providing a wireless identifier to system 102. Upon receiving the identifier and associating the identifier with a particular viewer 115, system 102 is able to collect information about the viewer (e.g., programs watched, time of day that the viewer watches television, favorite programs, etc.). Additionally or alternatively, the system 102 is able to provide viewer-related programs or other information to the viewer 115 when that viewer 115 is determined to be in proximity to system 102 and/or display 104. "Proximity" in this sense means that the viewer 115 is close enough to system 102 or display 104 to make effective use of the system. A viewer "in proximity" to system 102 and/or display 104 would typically be close enough to effectively control system 102 and/or to view programming on display 104. Such distances may be within a range of about 10-20 meters or so in some implementations, although this particular distance may vary widely from embodiment to embodiment based upon the size of display 104, the type and/or range of wireless communication that may be available, and any number of other factors. By identifying the viewer or viewers present in the vicinity of system 102 using wireless tags or the like, information can be automatically collected and/or provided in a very convenient manner.

To that end, television receiver system 102 is any type of set-top box (STB), satellite receiver, cable receiver, broadcast receiver, media player and/or other device capable of presenting media signals to a viewer 115 on a display 104. In the exemplary embodiment shown in FIG. 1, system 102 suitably includes a controller 105 that interacts with a programming interface 109, a network interface 108, a display interface 111, a storage interface 106 and/or a wireless interface 112 to present imagery to the viewer 115 on display 104. System 102 is also able to detect the physical proximity of a particular viewer 115 and to provide viewer-related information when viewer 115 is present, as described more fully below.

Controller 105 is any sort of microprocessor, microcontroller, digital signal processor or other logic capable of directing the actions and processes of system 102. In various embodiments, system 102 is based upon a "system on chip" (SoC) implementation that incorporates a hybrid microcontroller with memory, input/output and other features to perform the various signal processing and other actions of system 102. Various SoC and other integrated hardware implementations are available from Texas Instruments, Conexant Systems, Broadcom Inc., and many other suppliers as appropriate. Other embodiments may implement controller 105 and/or the other features of system 102 with any number of discrete and/or integrated processing components (e.g., any sort of microprocessor or microcontroller), memories, input/output features and/or other features as desired.

Programming interface 109 is any receiver, demodulator or other interface capable of receiving television or other media programming as desired. In various embodiments, programming interface 109 is a satellite, cable or broadcast television receiver, although other embodiments may alternately or additionally provide interfaces to a digital video recorder (DVR), digital versatile disk (DVD) and/or any other media source. Programming interface 109 may be logically and/or physically combined with controller 105 in various embodiments, and still other embodiments may not include a separately-identifiable programming interface 109, as appropriate.

Network interface 108 is any sort of physical, logical and/or other interface to network 110. In various embodiments, network interface 108 includes a conventional wired and/or wireless telephone or network adapter (e.g., a conventional network interface card (NIC) or the like). Interface 108 allows system 102 to communicate via any sort of "back channel" with a server 120 and/or the like. In various embodiments, the network interface 108 may be combined with the programming interface 109 in the sense that media programming may be received over network 110, as desired. Some embodiments may not include a back channel and may only provide local data processing, in which case network interface 108 may not be needed or present.

Network 110 is any digital or other communications network capable of transmitting messages between senders (e.g., system 102) and receivers (e.g., server 120). In various embodiments, network 110 includes any number of public or private data connections, links or networks supporting any number of communications protocols. Network 110 may include the Internet, for example, or any other network based upon TCP/IP or other conventional protocols. In various embodiments, network 110 could alternately or additionally incorporate a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks. Various embodiments may provide different features that make use of different types of networks 110, as described more fully below.

Display interface 111 is any physical and/or logical interface to display 104. Some types of systems 102 may incorporate a built-in display 104, such as the display in a laptop or other portable computer, a mobile phone, a personal digital assistant and/or the like. In other embodiments wherein system 102 provides video output signals to an external display 104, such signals may be provided in any compatible format. In embodiments wherein display 104 is a conventional television, for example, display interface 111 may provide video output signals 105 in any conventional format, such as component video, S-video, High-Definition Multimedia Interface (HDMI), Digital Visual Interface (DVI), IEEE 1394, and/or any other formats as desired. Programming content and/or other information may be equivalently presented on any sort of presentation device other than a conventional display, including any sort of audio, video, data, kinetic/tactile, and/or other feedback device. Various types of presentation devices could be accessed in a manner equivalent to that described herein for display 104 or the like.

Storage interface 106 is any sort of physical, logical and/or other interface to any type of internal or external storage device 107. In various embodiments, storage device 107 is a conventional disk drive, although other embodiments may provide mass storage in the form of flash or other memory, optical storage and/or the like. To that end, storage interface 106 may be any sort of conventional serial, parallel or other interface (e.g., peripheral component interconnect (PCI), universal serial bus (USB) and/or the like) capable of facilitating communications between controller 105 and any sort of internal or external storage. Storage device 107 may be used to store programming (e.g., as part of a DVR feature provided by system 102), programming instructions executed by controller 105, data (including data associated with any particular viewer 115), and/or other information as appropriate.

Wireless interface 112 is any sort of wireless receiver, transceiver or other sort of reader capable of wirelessly receiving identifier information from a tag or other transmitter 114. In various embodiments, wireless interface 112 is a conventional RFID reader that is able to transmit a polling signal to any tags 114 that may be in the vicinity of system 102 and to receive any number of reflected responses from the tags 114. Other embodiments may not be confined to RFID implementations, but may instead make use of any other short-range wireless signaling techniques such as IEEE 802.15.4 ("ZIGBEE"), IEEE 802.15.1 ("BLUETOOTH"), IEEE 802.11 ("WI-FI"), conventional infrared, and/or any other wireless techniques as desired.

System 102 is able to identify one or more particular viewers 115 that are physically located in proximity to the system 102 in any manner. In various embodiments, viewers 115 may have one or more wireless tags 114 on their person or otherwise in their immediate vicinity. Such tags 114 may be, for example, conventional passive RFID tags that backscatter or otherwise modulate a received signal in a pattern that indicates a numeric identifier that is unique to the tag 114. this identifier can be received at system 102 (e.g., via wireless interface 112) and further processed by controller 105 as appropriate.

RFID tags or other identifiers 114 may be provided from any source. In some embodiments, tag 114 may be found on a government-issued or other identification card, a credit or charge card, a wearable item, and/or any other product or item commonly carried or possessed by the viewer 115. Several examples of standard identification cards that incorporate RFID technologies can be found in ISO/IEC standard 14443 (e.g., the Type A and Type B cards described in International ISO/IEC Standard 14443-1:2008 ($2^{nd}$ Edition) dated 15 Jun. 2008), although any sort of standard or non-standard tags 114 could be equivalently used.

Other embodiments may use any sort of wireless techniques, including techniques other than RFID, to notify system 102 of the viewer's proximity. A telephone, personal digital assistant, media player or other device that provides any sort of close-range wireless communication (e.g., Bluetooth communication), for example, could serve the function of tag 114 in any number of equivalent embodiments.

System 102 typically receives identifiers from tags 114 via wireless interface 112. In various embodiments, system 102 transmits a polling signal to the vicinity of system 102 to identify any tags 114 that may be present. If one or more tags 114 are present, the tag 114 will respond with an identifier that uniquely identifies the tag 114. In some implementations, the identifier provided by tag 114 may be encrypted or otherwise obscured in some embodiments to protect the bearer's identity. Although some implementations may decrypt the identifier received from tag 114, decryption may not be needed in all embodiments. That is, it may not be necessary to obtain the specific name or other identity of the viewer 115. To the contrary, it may be sufficient for many embodiments to simply recognize that the same tag 114 (as indicated by the same identifier being provided by the tag 114) is present in proximity to system 102, without regard to the particular information encoded or otherwise provided within the identifier itself.

While the particular identifier need not necessarily be mapped to a particular individual's name or other identity, it may be useful in many embodiments to recognize repeated instances of the identifier and to record any information about actions taken with respect to system 102 when the identifier is present. That is, it can be recognized over time that when a particular identifier (corresponding to a particular viewer 115) is present in proximity to system 102, particular programs (and/or types of programs) are often viewed. Moreover, it may be desirable to record setting preferences (e.g., video or audio preferences) that are commonly set when the identifier is present. Such information may be accumulated into a "profile" 131 similar structure in any manner. This profile 131 may be stored locally (e.g., in memory associated with system 102 and/or in storage device 107) or remotely (e.g., on server 120), as described more fully below.

Moreover, system 102 may associate any particular viewer 115 with multiple tags 114 that may be observed over time. Viewer 115 may carry different tags 114 at different times, for example, with the identifiers from the various tags 114 being received, identified, and/or associated with the particular viewer 115 in any manner. Information from the multiple tags may be combined as desired into a common profile 131, for example, or separate profiles 131 could be maintained for each identifier on a temporary or other basis.

The information contained within profile 131 may vary widely from embodiment to embodiment. In some embodiments, some or all of the viewing history or other contents maintained in profile 131 may be manually or automatically editable to allow the viewer to conceal certain viewing habits (e.g., viewing of adult or other materials that may be wished to be kept private).

In various embodiments, system 102 operates in a primarily local manner, with identifiers corresponding to particular viewers 115 being used to create a viewing and/or preference profile 131, and to allow access to the profile data when the identifier becomes available at a later time. That is, as a viewer 115 becomes recognized over time, system 102 may respond to the viewer 115 coming into proximity of system 102 by automatically selecting that viewer's preferred settings or by otherwise providing access to profile data that has been collected for the associated viewer 115. Information in profile 131 may be further processed as desired. Advertisements may be selected, for example, based upon viewing habits or other information contained within the profile 131. Information in profile 131 may also be used to determine products or services (including television programs or other programming) that may be of interest to the particular viewer 115 based upon information stored in his or her profile 131. Such processing may be carried out by software instructions delivered to system 102 in any manner (e.g., installed at assembly or firmware burn-in/update, or delivered via a satellite, cable, network or other connection at a later date).

In other embodiments, viewer information such as that stored in profile 131 may be maintained remotely. Server 120, for example, could obtain viewing information, profile data and/or any other information from system 102 via network 110 or any other appropriate backchannel. Such information may be maintained in a database 122 or the like for subsequent retrieval from system 102, or from any other location accessible via network 110. In such embodiments, server 120 is any network server capable of obtaining information via network 110 or any other suitable backchannel from system 102, and of storing and/or processing such information as appropriate. Such a server may also provide information to other devices (e.g., devices 125, 126, 127 in FIG. 1) as the viewer 115 travels or otherwise comes into proximity with those devices 125-127.

Although server 120 maintains profile information 131 in database 122 in some embodiments, other embodiments of server 120 may simply provide a "referral" service that allows remote devices 125-127 to obtain profile 131 and/or other information regarding viewer 115 from a home system 102. When tag 114 is identified in proximity to any device 125-127, for example, the device may query server 120 to determine if the tag 114 is recognized, and if so, where the profile information 131 associated with the tag 114 can be obtained. Such information 131 may then be obtained from database 122, storage 107 on system 102, and/or any other location as desired. In still other embodiments, server 120 provides additional functionality in terms of processing information stored within one or more profiles 131, as described more fully below.

By identifying the viewer 115 via a wireless identifier associated with a tag 114, many different and beneficial services and features can be provided. As a particular viewer 115 becomes associated with a particular tag 114, the presence of tag 114 in proximity to system 102 or any other system can be used to provide viewer-related programming or other content to the viewer's particular location. As a viewer 115 travels, for example, a system (e.g., system 126) in a hotel room or other remote location could identify the viewer 115 from tag 114 and provide automatic and convenient access to suggested programming, favorite programs, placeshifted content (e.g., content streamed or otherwise shifted from system 102 to system 126 in this example), and/or the like.

Various embodiments may provide enhanced security for information obtained in remote locations. Tags stored within the remote system 126, for example, may be flushed or refreshed on a periodic or other relatively frequent basis (e.g., daily or so, in the case of a hotel room, perhaps hourly or otherwise in more public settings) to preserve security and privacy. Further, in some embodiments, increased security beyond the mere presence of a single tag 114 may be required before granting access to remotely-stored information. Such security may be provided by requiring the presence of a uniquely-assigned tag 114 (e.g., a tag assigned by the operator of system 100), a tag 114 with a decryptable identifier, and/or any other sort of enhanced tag security. In further embodiments, enhanced security may be provided by scanning for multiple tags 114 all associated with a common viewer. Such tags may represent tags in clothing, an identification card, and/or any other tags that may be physically present with the particular viewer 115. In such embodiments, the combination of tags 114 all associated with a common viewer 115 can significantly improve the likelihood that the person in possession of the multiple tags 114 is truly authorized to access the information associated with that viewer 115.

In a more localized example, as a viewer 115 moves around a home (or any other structure), any televisions or other displays 125-127 located in the structure could be automatically tuned to the program that the viewer is enjoying whenever the viewer 115 comes into proximity with the display 125-127. As the "remote" display systems 125-127 sense the presence of tag 114 in this example, the remote systems 125-127 could obtain information from system 102 (or any other source) indicating the program currently being enjoyed by viewer 115, which would then allow the system in closest proximity to tag 114 to automatically tune that same program. If the program channel were not available (e.g., because the new display 125-127 lacks a tuner or decoder for the program source of the channel), some embodiments could provide streaming or other placeshifting of the program from system 102 or any other source. If a viewer 115 was watching a television program delivered to a satellite or cable receiver 102, to cite just one example, that same program could be streamed over network 110 to a display 125 associated with a computer system, even though the computer system may not be otherwise able to receive television content. This could be provided through conventional placeshifting techniques, such as those described in U.S. Patent Application Publication No. 2006/0095471 entitled "Personal Media Broadcasting System" filed on Jun. 7, 2005, although other placeshifting techniques could be used in any number of equivalent embodiments.

Note that automatic selection of a currently-viewed program may be tempered based upon parental controls, privacy and/or any other number of rules that may be manually configured or automatically applied. If a particular display commonly used by children (e.g., in a childs room) had a parental control imposed, for example, automatic tuning of content that would otherwise be blocked by the parental control could be suspended. Similarly, if the reader 112 identified that other persons were present before the particular viewer 115 entered the room, it may not be desirable to change the channel that the other persons were viewing. Still further, various embodiments could allow identification of multiple persons in proximity to the viewing device using tags 114, and provide an image that is most suitable for the collection of persons. If the group includes one or more children, for example, or one or more adults who do not wish to view inappropriate content, then the programming may be suitably restricted as desired.

Turning now to FIG. 2, an exemplary method 200 for presenting viewer-related programming or other content to a particular viewer 115 suitably includes the broad steps of receiving at least one wireless signal, where each signal received includes a unique wireless identifier when the particular viewer is in proximity to the television viewing device or other presentation device (function 202), associating the wireless identifier(s) with the particular viewer (function 204), and, upon successfully associating the wireless identifier(s) with the particular viewer, providing access to the information associated with the particular viewer or an aggregate viewer corresponding to the identified user's profile (function 210). Various other functions and other features may also be provided, as described in increasing detail below.

Generally speaking, the various functions and features of method 200 may be carried out with any sort of hardware, software and/or firmware logic that is stored and/or executed on any platform. Some or all of method 200 may be carried out, for example, by logic executing within system 102, server 120 and/or remote systems 127-127 in FIG. 1. In one embodiment, controller 105 executes software logic that performs each of the various functions shown in FIG. 2. In other embodiments, the data processing function (e.g., function 216) could be executed on server 120 or another platform. Further, functions 208 and 210 (relating to obtaining and providing access to viewer-related data) may be performed by the display system that is closest to the particular viewer 115 in many embodiments. Hence, the particular logic and hardware that implements any of the various functions shown in FIG. 2 may vary from context to context, implementation to implementation, and embodiment to embodiment in accordance with the various features, scenarios and structures set forth herein. The particular means used to implement each of the various functions shown in FIG. 2, then, could be any sort of processing structures that are capable of executing conventional software logic in any format. Such processing hardware may include controller 105 or other components of system 102 in FIG. 1, as well as any processors or other components associated with server 120 and/or systems 125-127 as appropriate.

A wireless reader or other transceiver may be associated with any number of systems 102, 125-127 and/or the like, with polling and processing of received identifiers executed in any manner to identify viewers 115 that may be in proximity to the particular system. Wireless signals containing identifiers are received in any manner (function 202). In various embodiments, function 202 involves transmitting a wireless query signal, receiving reflected signals from any tags 114 or other transmitters in proximity to the wireless reader, and then isolating one or more identifiers contained in the response signals that are received. Wireless interface 112, for example, may provide a polling signal or other broadcast to the vicinity of system 102 and may receive any number of responses using a conventional RFID or other wireless transceiver, as described above.

Wireless signals received from tags 114 may contain numeric, alphanumeric and/or other identifier information that is backscattered or otherwise modulated on the reflected signal. Passive RFID tags 114, for example, typically backscatter a particular identifier code that is associated with the tag on a signal that is reflected back in response to the polling signal transmitted by the RFID reader. Active RFID tags may provide additional information or processing, as may other types of wireless transceiver tags 114 (e.g., Bluetooth transceivers or the like). Other polling and processing techniques may be used in any number of alternate embodiments.

Received identifiers may be associated with one or more particular viewers 115 in any manner (function 204). In various embodiments, any identifiers received in response to function 202 are isolated, and a query may be placed to a database to determine if the identifier has been previously encountered. The database may be local (e.g., in memory associated with system 102 or on storage device 107) and/or remote (e.g., database 122 associated with server 120 and accessible via network 110). In either case, an attempt is made to determine (function 206) if the received identifier has information associated with it (thereby indicating that the viewer 115 is recognized), or if the identifier is newly-encountered. This function may be executed by, for example, positing a query to the relevant database and receiving a suitable response. As noted above, it is not necessary in all embodiments to uniquely identify the viewer 115 by name or other information. To the contrary, viewer information may be simply indexed or otherwise associated with the identifier itself, without the need to decrypt or otherwise decode the identifier to more particularly identify the viewer 115. Some embodiments may associate one or more identifiers with known users (e.g., subscribers) of system 102, although this feature is not required in all embodiments. Indeed, the relative anonymity afforded by not decrypting the identifier may be desirable in some embodiments.

Additional security can be provided in some embodiments by checking for multiple tags 114 associated with a particular viewer 115 (e.g., by requiring an identifier from multiple tags associated with the viewer 115 to be simultaneously in the proximity of the reader 112. Such multiple tags 114 can be associated with identification cards, credit cards, articles of clothing, and/or any other items carried, worn or otherwise possessed by the particular viewer 115.

If the particular viewer is recognized in function 206, then viewer-related content, programming or other information may be retrieved (function 208) and provided to the viewer (function 210). The particular information retrieved will vary according to the embodiment and features provided, but may include viewing preferences, targeted advertisements or other services, favorites, settings, access to placeshifted content, and/or the like. Further, the information may be obtained from any source. In a local implementation, profile information 131 or the like may be obtained from local storage (e.g., memory or storage device 131) and made available on a local display 104 when the viewer 115 is present. In other embodiments, information may be obtained from a home system 102 or server 120 to be provided on a "remote" system 125-127 that is in closer proximity to the viewer 115. Additional information about the particular information provided to the identified viewer 115 is described above and below.

In various embodiments, if the particular viewer 115 is not recognized in function 206, then an advertisement or other "new user"/default content may be provided. Such content may include helpful "how to" information that allows new users to become more familiar with system 102, for example. Such content may also include advertisements for goods or services that may be of general interest, or that may be of particular interest to new users of system 102 (e.g., advertisements for programming packages or other services offered by a content aggregator). Such advertisements may be provided as banner ads (e.g., a banner ad presented during a viewing of an electronic program guide (EPG) feature of system 102), as a television advertisement, and/or in any other manner. Other embodiments may take different default actions, or no actions at all, when viewer 115 is not recognized.

Whether or not the particular viewer 115 has been previously encountered, viewing information may be collected while the identifier from any particular tag 114 remains present (function 212). This allows for viewing profiles 131 or other information to be gathered for a number of different viewers 115 that may make use of any particular system 102. In various embodiments, the presence of multiple tags 114 (corresponding to the presence of multiple viewers 115) may be processed separately from the presence of individual tags 114. This feature may be beneficial, for example, in establishing viewing profiles 131 for a husband and wife viewing together, a parent viewing with one or more children, multiple children watching together with or without a parent present, and/or any other combinations of viewers 115. Any number of different profiles 131 and/or other information may be associated with any number of tags 114 and/or viewers 115 as desired.

Information gathered in function 212 may be stored in any manner (function 216). As noted above, information may be stored in a data profile 131 or other database entry in local and/or remote storage as appropriate for the particular embodiment. The stored information may be processed (function 216) as desired, and for any purpose. As noted above, processing may take place locally (e.g., on system 102) and/or on a remote server 120. In some embodiments, such processing includes any sort of evaluation of data profile 131 to identify advertisements, programs, goods and/or services that may be of interest to viewer 115. As an example, a viewer 115 that is recognized as enjoying adventure movies and sports may be targeted with an advertisement for a certain product, whereas other viewers 115 who are recognized as watching romantic films and soap operas may be targeted with an advertisement for a different product. Similarly, the viewer 115 identified as enjoying adventure movies could be notified of an upcoming showing of a new adventure movie, or other programs or products that are likely to be enjoyed by fans of adventure movies.

Other types of processing 216 that may be provided in different embodiments could include simply updating the viewer-related information maintained in the database to account for newly-observed viewing patterns or other information. In still other embodiments, conventional data mining may be applied (with or without regard to the identity of the viewer 115) to one or more profiles 131 to ascertain aggregate viewing habits or other information about various types of viewers 115. Many other types of processing could be applied at system 102, server 120 and/or elsewhere in any manner.

In still other embodiments, processing 216 may include maintaining a more detailed profile 131 associated with the viewer 115 based upon information provided by the various tags 114 in the viewer's possession. Such information may be further enhanced through information known to server 120 (or system 102) based upon subscriber database information, geographic information, and/or the like. For example, if a viewer 115 is known to possess a certain brand of shoes, or an affinity for a certain type of clothing, or certain types of credit cards (to name just a few examples), this demographic-type information can be useful in targeting advertisements to the viewer, or in further establishing a consumer profile of the particular viewer that can be used for any purpose. Using information gleaned from RFID identifiers present in clothing or other products, for example, it can be readily determined that a viewer enjoys certain types of programs (e.g., sports and adventure movies), wears a certain brand of shoes (e.g., NIKE shoes), lives in a particular region (e.g., Denver Colo.), and/or the like. Information could also be obtained from tags that may identify home furnishings or other items that may come into proximity with the reader 122. Tags may be associated with display 104 and/or other audio/visual components, for example. Such information could be used to identify particular brands and models of other audio/visual components working with or in proximity to system 102, for example; this information could be used to automatically configure system 102 to work with the particular display 104 or other components, or to take other actions as may be desired. All of such information can be readily stored and processed within a profile 131 for further analysis, marketing, targeting of ads, and/or other services and features as may be appropriate.

Note that the information contained in the profile 131 may be used in any manner. If the profile 131 indicates that a particular viewer 115 owns several different products (e.g., jackets or coats), the system 102 could actually recommend one of the particular products based upon current conditions. For example, if the profile 131 indicated that the viewer 115 had previously been associated with a winter coat, a raincoat, a windbreaker, and one or more sweaters, the system 102 (or system 120, as appropriate) might suggest an appropriate jacket or coat based upon the current weather conditions in the viewer's location. Many different applications of profile data could be formulated and used for the convenience of viewer 115 in many different embodiments.

Collection and processing of identifier data may be repeated as desired (function 218). Polling signals may be transmitted on a periodic basis (e.g., every few seconds to every few minutes or so), and/or on any aperiodic basis as appropriate. Polling may be provided at system startup or when inputs are received, for example, with additional regular or irregular polling performed on any temporal basis to ensure that the viewer 115 is still in proximity to the display 104.

The general systems, structures and techniques described above may be inter-combined or otherwise exploited to provide any number of different features. In a simple embodiment, a single system 102 may simply use an RFID or other wireless reader to identify a particular viewer 115 and to automatically provide that viewer's preferred information while the viewer is present. Other embodiments could further incorporate collecting of viewing data 131 associated with a particular viewer 115 so that patterns or other preferences can be identified. Still other embodiments may allow the viewer 115 to obtain automatic access to information and/or programming from remote locations. For example, a travelling viewer could be automatically identified using the wireless tag, and the identified viewer could be provided with access to preferences, placeshifted programming and/or other features as desired. In still other embodiments, multiple viewing systems 102, 125-127 located within a home or other environment could readily inter-communicate to tune a current program as the viewer 115 moves throughout the structure to come into proximity with other displays. Numerous other features could be formulated across a wide array of alternate but equivalent embodiments.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A system for presenting viewer-related programming comprising:
a wireless reader configured to receive an identifier when a particular viewer is in proximity to the reader; and
a controller configured to receive the identifier from the wireless reader and to associate the identifier with the particular viewer, and, upon successfully associating the wireless identifier with the particular viewer, to automatically receive and present the viewer-related programming via a presentation device located within a proximity of the wireless reader, wherein the viewer-related programming comprises television content that was previously selected by the viewer.

2. The system of claim 1 wherein the wireless reader is an RFID reader and the identifier is an RFID code received from an RFID tag located in physical proximity to the particular viewer.

3. The system of claim 1 further comprising a storage interface to a digital storage device, and wherein the controller is further configured to obtain the viewer-related programming associated with the particular viewer from the storage interface.

4. The system of claim 1 further comprising a network interface configured to be coupled to a network that provides communication between the system and a remote server having a database, and wherein the controller is further configured to automatically obtain the viewer-related programming associated with the particular viewer from the database via the network.

5. The system of claim 4 wherein the viewer-related programming comprises place shifted content obtained via the remote server.

6. The system of claim 1 wherein the controller is configured to automatically present the television content previously selected by the viewer on the presentation device when the particular viewer is in physical proximity to the reader.

7. A method of providing access in a television viewing device to viewer-related programming associated with a particular viewer, the method comprising:
receiving a wireless signal comprising a wireless identifier when the particular viewer is in proximity to the television viewing device;
associating the wireless identifier with the particular viewer; and
upon successfully associating the wireless identifier with the particular viewer, automatically providing access on the television viewing device to the viewer-related programming associated with the particular viewer, wherein the viewer-related programming comprises television content that was previously selected by the viewer.

8. The method of claim 7 wherein the wireless identifier comprises the presence of a Bluetooth device.

9. The method of claim 7 further comprising compiling data related to the viewer information at the television viewing device.

10. The method of claim 9 wherein the compiling comprises updating the viewer information based upon actions of the particular viewer with respect to the television viewing device.

11. The method of claim 7 further comprising obtaining the viewer-related programming from a database at the television viewing device.

12. The method of claim 7 further comprising obtaining the viewer-related programming from a database at a remote server.

13. The method of claim 12 further comprising transmitting updated viewer-related programming based upon actions of the particular viewer with respect to the television viewing device to the remote server.

14. The method of claim 12 wherein the viewer-related programming comprises a listing of place-shifted content available via the remote server.

15. The method of claim 7 wherein the viewer information comprises a viewing preference determined based upon a prior viewing history of the particular viewer.

16. The method of claim 7 wherein the method further comprises transmitting an identification of a currently-viewed program to a second television viewing device when the particular viewer is in proximity to the second television viewing device to thereby allow the second television viewing device to automatically tune to the currently-viewed program when the particular viewer moves toward the second television viewing device.

17. The method of claim 7, wherein the wireless identifier comprises an RFID code, and wherein the method further comprises:
broadcasting an RFID query signal from the television viewing device;
receiving the wireless signal comprising the RFID code from an RFID tag in physical proximity to the particular viewer;
isolating a plurality of RFID codes associated with the particular viewer and storing the plurality of RFID codes in a database; and
subsequently identifying the particular viewer based upon the subsequent presence of the plurality of RFID codes.

18. A television receiver system for receiving and decoding television programming for presentation on a television, the television receiver system comprising:
an RFID reader configured to broadcast a wireless RFID query and to receive a wireless signal comprising an RFID code when an RFID tag in the possession of a particular viewer is in proximity to the system;
a television interface configured to be coupled to the television; and
a controller configured to receive the RFID code from the RFID reader when the particular viewer is in proximity to the system and to associate the RFID code with the particular viewer, and, upon successfully associating the wireless identifier with the particular viewer, to automatically receive and present viewer-related programming previously selected by the particular viewer via the television interface.

19. The television receiver system of claim 18 wherein the controller is further configured to provide an identification of a program currently viewed on the television to a second television viewing device when the particular viewer is in proximity to the second television viewing device to thereby allow the second television viewing device to automatically tune to the currently-viewed program as the viewer moves away from the television receiver system.

20. The television receiver system of claim 18 further comprising a network interface configured to be coupled to a network that provides communication between the television receiver system and a remote server, wherein the viewer-related programming comprises placeshifted programming content stored at the remote server, and wherein the controller is further configured to obtain the placeshifted programming content associated with the particular viewer via the network.

* * * * *